US008554749B2

(12) United States Patent
Herbach (10) Patent No.: US 8,554,749 B2
(45) Date of Patent: Oct. 8, 2013

(54) DATA FILE ACCESS CONTROL

(75) Inventor: Jonathan D. Herbach, Mountain View, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1419 days.

(21) Appl. No.: 11/585,418

(22) Filed: Oct. 23, 2006

(65) Prior Publication Data

US 2008/0097998 A1 Apr. 24, 2008

(51) Int. Cl.
*G06F 17/00* (2006.01)
*G06F 17/30* (2006.01)
*G06F 9/00* (2006.01)
*G06F 3/00* (2006.01)

(52) U.S. Cl.
CPC ........... *G06F 17/00* (2013.01); *G06F 17/30* (2013.01); *G06F 9/00* (2013.01); *G06F 3/00* (2013.01)
USPC ........... 707/694; 707/782; 707/783; 707/786; 713/165; 713/166; 713/170; 715/743

(58) Field of Classification Search
USPC ................ 707/1, 9–10, 200, 694, 782–783, 707/786; 713/165–166, 168, 169–170, 154, 713/189; 726/2, 5, 8–9, 10; 709/220–229; 705/26–27; 715/743
See application file for complete search history.

(56) References Cited

U.S. PATENT DOCUMENTS

| | | | | |
|---|---|---|---|---|
| 5,729,734 A * | 3/1998 | Parker et al. | ....................... | 707/9 |
| 6,070,244 A * | 5/2000 | Orchier et al. | ..................... | 726/1 |
| 6,122,741 A * | 9/2000 | Patterson et al. | ................ | 726/17 |
| 6,275,824 B1 * | 8/2001 | O'Flaherty et al. | ................ | 707/9 |
| 6,275,825 B1 * | 8/2001 | Kobayashi et al. | ................ | 707/9 |
| 6,311,269 B2 * | 10/2001 | Luckenbaugh et al. | ....... | 713/154 |
| 6,633,872 B2 * | 10/2003 | Ambrosini et al. | ................ | 707/9 |
| 6,647,388 B2 * | 11/2003 | Numao et al. | ..................... | 707/9 |
| 6,785,728 B1 * | 8/2004 | Schneider et al. | ............ | 709/229 |
| 6,954,792 B2 * | 10/2005 | Kang et al. | ..................... | 709/229 |
| 7,013,332 B2 * | 3/2006 | Friedel et al. | .................. | 709/223 |
| 7,127,461 B1 * | 10/2006 | Zhu et al. | .......................... | 707/9 |
| 2002/0138572 A1 | 9/2002 | Delany et al. | | |
| 2003/0154381 A1 * | 8/2003 | Ouye et al. | ..................... | 713/182 |
| 2003/0177122 A1 | 9/2003 | Makansi et al. | | |
| 2003/0225801 A1 | 12/2003 | Devarakonda et al. | | |
| 2005/0097061 A1 * | 5/2005 | Shapiro et al. | ................... | 705/67 |
| 2005/0246762 A1 * | 11/2005 | Girouard et al. | ................... | 726/2 |
| 2007/0208665 A1 * | 9/2007 | Ohara | .............................. | 705/51 |

FOREIGN PATENT DOCUMENTS

WO  WO 2008051792  *  5/2008
WO  WO-2008051792 A3  5/2008

OTHER PUBLICATIONS

Konstantina Stoupa et al. "Credential based policies management in an access control framework protecting XML resources", ISCIS 2006, LNCS-4263, pp. 603-612.*
"International Application Serial No. PCT/US2007/081781, International Search Report mailed Jun. 5, 2008", 4 pgs.
"International Application Serial No. PCT/US2007/081781, Written Opinion mailed Jun. 5, 2008.", 5 pgs.

* cited by examiner

*Primary Examiner* — Srirama Channavajjala
(74) *Attorney, Agent, or Firm* — Schwegman Lundberg Woessner P.A.

(57) ABSTRACT

In one embodiment, a data file and policy are generated. The policy is then associated with the data file, wherein the policy includes one or more unassigned accounts and an access control definition that defines an access permission associated with each of the one or more unassigned accounts.

35 Claims, 9 Drawing Sheets

DATA FILE ACCESS CONTROL

FIELD

This application relates to controlling access to data files.

BACKGROUND

Generally a distributor or publisher of a data file would like to distribute the data file in a secure fashion and allow access to only select target users. Traditionally, the distributor of a data file searches a data file management system for target users that need to be included in the policy associated with accessing the data file. The resulting search only shows target users known to the data file management system. If the distributor does not find the target user to exist, the distributor may add the target user by adding the email address of the target user to the policy and send a notification email to the target user with an invitation to create an account and be included in the policy. However, once the data file (and policy) have been created and distributed new target users cannot be subsequently added without creating a new data file and associated policy.

BRIEF DESCRIPTION OF DRAWINGS

The present invention is illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of an embodiment of the present invention. It will be evident, however, to one skilled in the art that the present invention may be practiced without these specific details.

As used herein, a "data file" includes, inter alia, "electronic document" and "electronic data file." The terms data file and electronic data file include a set of electronic data, including both electronic data stored in the data file on a portable tangible medium (e.g., compact disc (CD), flash drive, etc.) and electronic data received over a network and dynamically processed or stored (permanently or temporarily) for subsequent processing. The electronic data may include, but is not limited to, encrypted and non-encrypted text files, audio/visual files (e.g., music, video, and speech), etc. The data file may be represented as a single data file icon in a graphical target user interface (GUI) of an operating system (OS) or a software application. Further, references to the data file may not necessarily correspond to the entire data file. For example, the data file may be a reference to a portion of the entire data file, in a set of coordinated files, etc.

A "target user" is a target user (person), group of target users, process(es) or entity intended to receive and access a secured data file. For example, a target user may be a group of target users defined to include all vice presidents in an enterprise. For simplicity, a target user has been used herein as primarily a target person. However, it can be appreciated a target user may be, as defined above, a group of target persons or entity without departing from the novel features described herein or their equivalents. A process may be an application or program. For example, a person isn't provisioned access but a specific target application may be provisioned access to the data file while excluding other applications. An entity may be one or more non-persons, such as machines or fictitious email accounts).

Additional terms include: a "target user management system" which is a database that contains target user account information (e.g., lightweight directory access protocol (LDAP)); "provisioning" which may include creating a target user account through a self service process (e.g., email registration process); "publisher" a person or entity to distribute the data file; "policy" which includes, inter alia, an access control definition that in part defines one or more access permissions a target user may have for the data file, the policy may further include components embedded within the data file and components on a server; "access control list" (ACL) a mapping of target users to permissions (e.g., Unassigned1 and John Smith can print the data file while Unassigned2 can only view the data file, etc.); and "access" to the data file including, but not limited to, opening, viewing, editing, printing, and executing code within the data file.

In various embodiments, the systems and techniques described herein may be used with many different types of data files. For example, portable document format (PDF) data files. PDF data files are in a format originated by Adobe® Systems Incorporated of San Jose, Calif. A PDF data file is an example of an electronic data file in a platform-independent data file format that may define an appearance of the electronic data file. This data file format may be a platform independent storage format capable of storing many different types of data, including graphics, animation and sound. The defined appearance may be defined for multiple types of display devices to provide a data file creator/editor with control over the look and feel of the data file regardless of the final destination device. In various embodiments, data files of this format have an advantage in that the data file management system does not require architecture tied to a particular software development platform (e.g., the system may be designed to run on Java® and .NET). Thus, the data file management system may readily function across several platforms.

In various embodiments, the systems and techniques described may be used in a data file management system, which in turn may be used by an enterprise in connection with data file management. The data file management system may operate as a stand-alone system, as a component of another system, and may provide persistent data file security by controlling who may access (e.g., view, edit, print) data files, whether the data file resides on a server and the target user is online or accessed locally in an offline mode. In one embodiment, portions of the data file management system may be used to create a policy associated with a data file that may be distributed to one or more target users (e.g., on client machines) in a network architecture, such as a client-server architecture.

The policy may include one or more unassigned accounts having associated permissions pertaining to various rights associated with the data file (e.g., print, view, copy, etc.). A target user may be granted access to some or the entire data file when the target user is associated with one of the one or more unassigned accounts included (e.g., embedded) in a policy section of the data file. The provisioning of the target user to be granted access may be by the target user's request or pushed out to the target user by an administrator of the data file. Additionally, access may be revoked based on rules associated with access to the data file. For example, a rule may require the target user to periodically access a server on-line to renew a data file subscription, etc. In one embodiment, an unassigned account may be reused. For example, once a target user has been disassociated with an unassigned account, a new target user may then be associated with the unassigned account. In various other embodiments, the target user may request or be provisioned a new level of access to the data file by being associated with a different unassigned account. For example, a new level of access may be in the form of increased privileges with respect to access to the data file. These privileges may include printing, saving, distributing, editing, etc.

Figure 1:
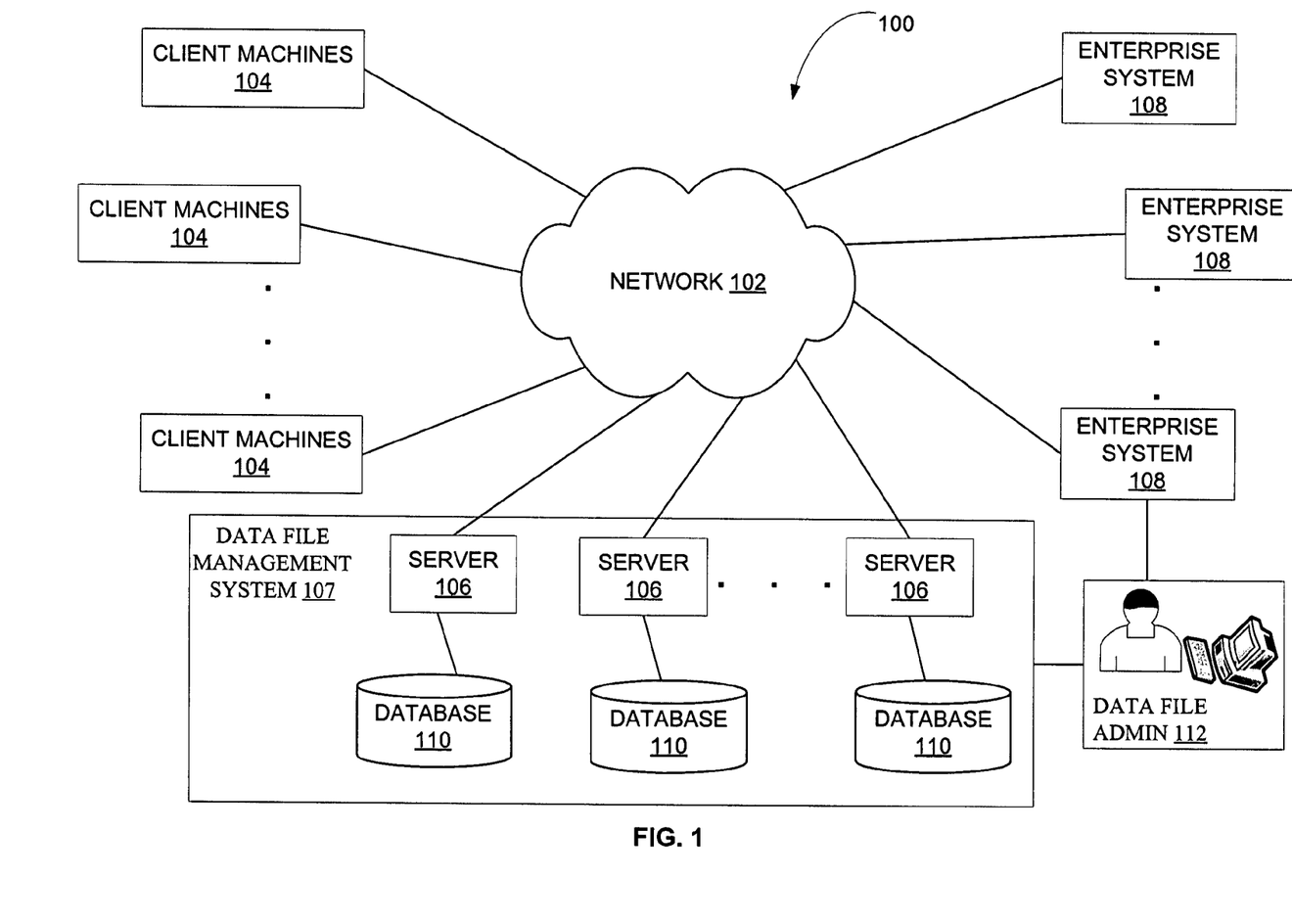
FIG. 1 is a block diagram illustrating an example embodiment of an operational environment for a data management system.

FIG. 1 is a block diagram illustrating an example embodiment of an operational environment for a data management system 100. The network 102 provides communication links between one or more client machines 104, one or more servers 106 of data file management system 107, and one or more enterprise systems 108. The one more servers 106 may include databases 110 to store and maintain data associated with data file management, such as data files, data file policy information, authentication information, etc. A data file administrator 112 may be coupled to one or all of the data file management system 107 and the enterprise systems 108 to provide content in the form of data files to be distributed to one or more target users (not shown) of the client machines 104. In various example embodiments, the data file administrator 112 may be single distributor of one or more data files, a mass distributor of a multitude of data files, or an administrator of third party data files.

The network 102 may be any communication network known in the art for linking machines capable of communicating using one or more networking protocols, including but not limited to a local area network (LAN), metropolitan area network (MAN), wide area network (WAN), enterprise network, virtual private network (VPN), a cellular network, and/or the Internet. The client machine 104 may be any machine(s) or process(es) that communicate over the network 102 with the data file management system 107 (servers 106), and the data file management system 107 may communicate over the network 102 with one or more enterprise systems 108. Moreover, the client machines 104 may also communicate with the one or more enterprise systems 108 over the network 102.

The enterprise systems 108 may be configured to include elements similar to the data file management system 107, including one or more storage systems, authentication systems, and communication systems. For simplicity, the functionality of the data file management system 107 is described herein as a stand alone system. However, it can be appreciated the data file management system 107 including some of all of its functionality may be implemented in various other components of the data management system 100, including the enterprise systems 108 and in some cases the client machines 104.

The servers 106 may be designed to integrate with existing enterprise systems 108 and leverage existing enterprise infrastructure. For example, the servers 106 may provide support for target user and group information in enterprises, where such information may come from multiple sources. The servers 106 may provide data file (e.g., electronic data file) security. For example, the data file management system 107 may distribute a data file and selectively provision a target user revocable access to the data file. Additionally, the data file administrator 112 may include an offline-access mechanism in the data file that allows for a target user to have access to the data file while offline, even if the target user has not previously been provisioned in a policy definition associated with the data file or known to the data file management system 107.

Figure 2A:
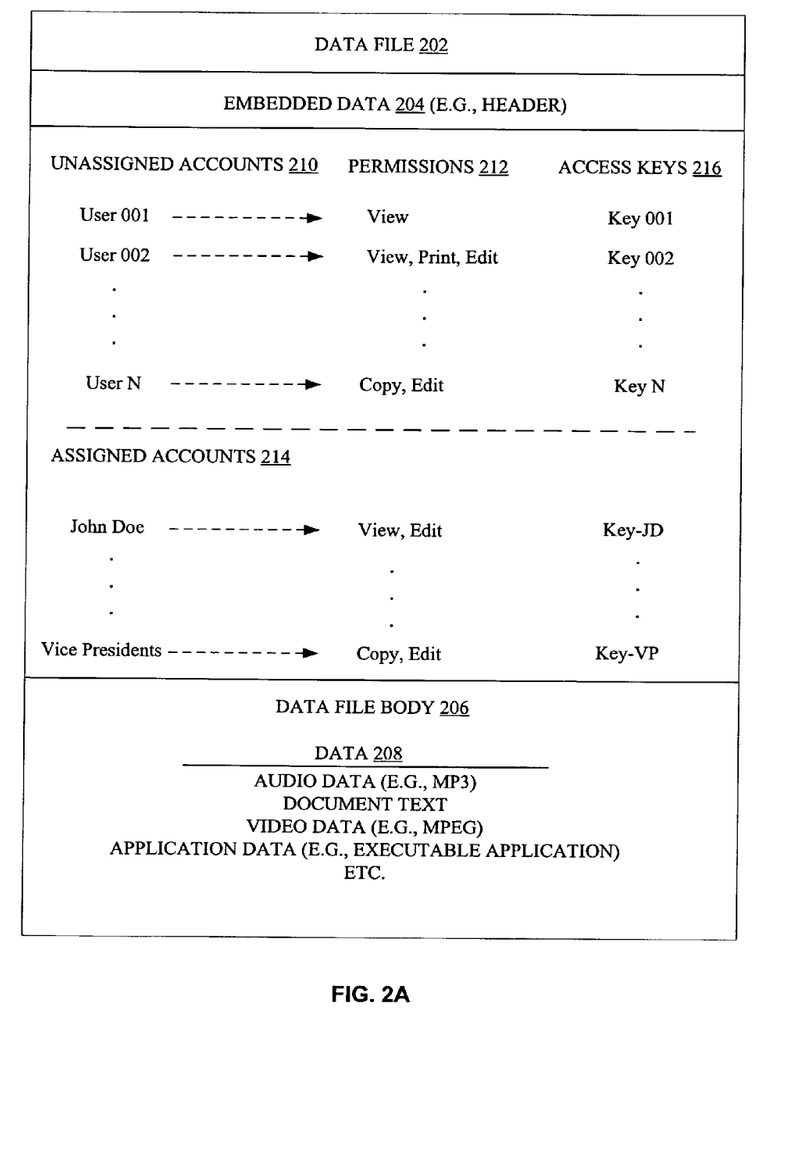
FIG. 2A illustrates an example embodiment of a data file including embedded policy information.

FIG. 2A illustrates an example embodiment of a data file 202 including embedded policy information. A policy includes an access control definition that indicates which target users should have what access permission for a resource, such as the data file 202. In various embodiments, every data file has its own unique policy. For example, although a data file may be a copy of another data file with respect to its contents, it has its own unique policy. Consequently, different copies of a data file (e.g., data file 202) may or may not have different policy information for provisioning access to the data file.

The data file administrator 112 in creating a policy for the data file 202 may include the embedded data 204 in the data file 202. The embedded data 204 of the data file 202 includes policy data associated with provisioning access to all or portions of a data file body 206, such as data 208. The data 208 may include, but is not limited to, audio data, video data, text data, application data, etc. The data file 202 may be distributed by the data file administrator 112 via the data file management system 107 and/or one or more enterprise systems 108.

Returning to the example embodiment of the embedded data 204, it may include one or more data fields, such as unassigned accounts 210, access permissions 212, assigned accounts 214, and access keys 216. The unassigned accounts 214 may be created by the data file administrator 112 (e.g., creator) and initially do not have an association with a real person or entity in the data file 202 or on the data file management system 107. The access keys 216 associated with the unassigned accounts 210 may be included but not activated until the target user has been authenticated, either locally at the client machine 104 or remotely via the data file management system 107. In another embodiment, the access keys 216 may be provided after the client machine 104 receives the data file 202 and is authenticated via the data file management system 107. In yet another embodiment, the access keys 216 may be dynamically generated by an executable portion of the data file 202 and optionally communicated to the data file management system and associated with a mapping between the unassigned account and the target user. A combination of these embodiments may also be implemented to secure the data file 202 for provisional access.

The embedded data 204 may also include assigned accounts 214. The assigned accounts 214 include real target users, (person or persons), or entities that are provisioned access at data file creation. The unassigned accounts 214 and the assigned accounts 214 have access permissions 212 associated with each account. For example, the unassigned account "User 001" only has access or permission level to view, while the assigned account corresponding to person "John Doe" has been provisioned access to copy and edit.

The unassigned accounts 210 allow the data file administrator 112 to reserve access provisioning for future target users that remain unknown at data file creation. The data file administrator 112 via the data file management system 107 may then dynamically provision access to selected target users (e.g., client machines 104) without having to release a new data file including the new target users provisioned via the assigned accounts 214. For example, the data file administrator 112 may mass mail a compact disc including data 208 and 100,000 unassigned accounts. Based on a business model, such as a subscription model, a target user (client machine 104) may provide authentication information (e.g., name, credit card data, etc.) to the data file management system 107. The data file management system 107 may then provision access (e.g., via email unassigned user name and password) to the target user conditioned upon meeting the requirements that may be associated with the business model. In one embodiment, conditional requirements may include periodic on-line communication with the data file management system 107 to reconfirm authentication. Absent such communication the provisional access may be revoked and the target user may lose their access to the data file, either by a communication from the data file management system 107, or if offline by expiration of a time limit as defined within the data file.

Figure 2B:
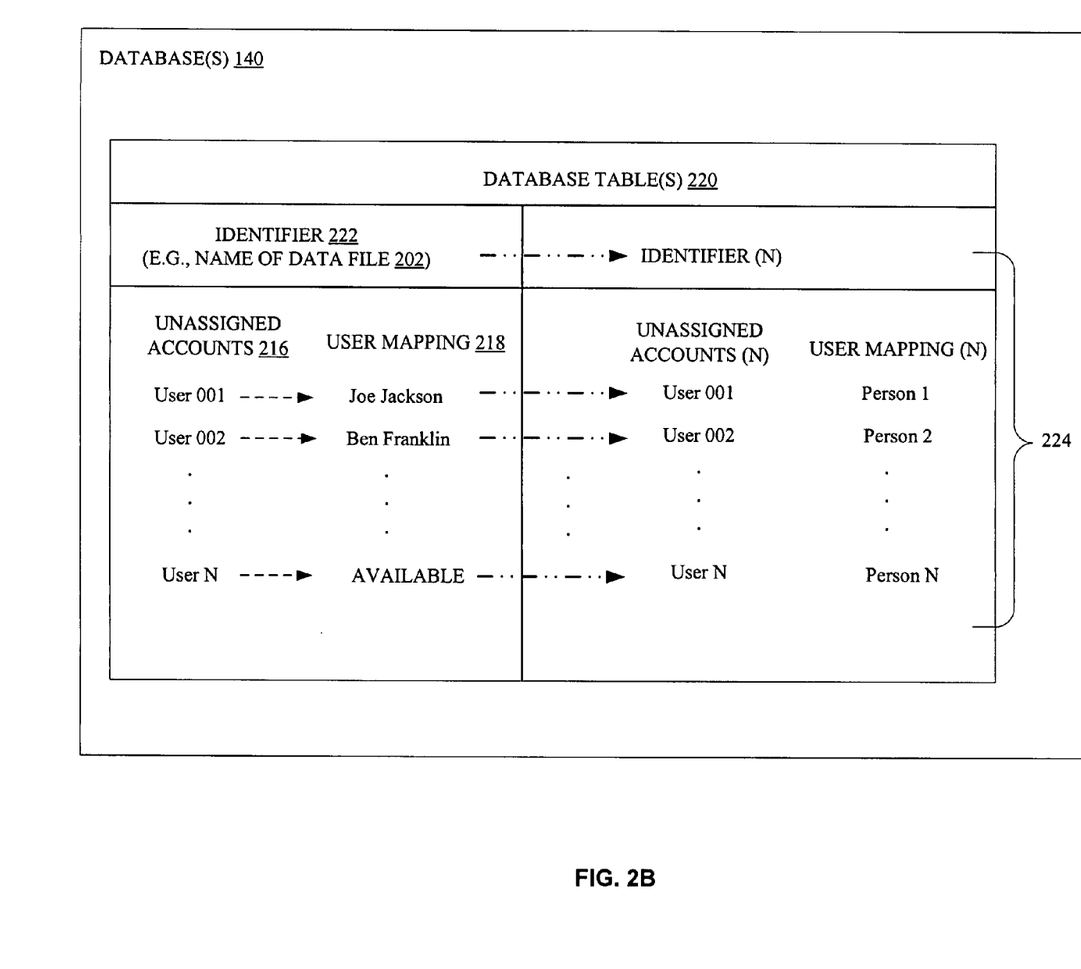
FIG. 2B is an embodiment of an access control list (ACL) in the example form of a database table.

FIG. 2B is an embodiment of an access control list (ACL) in the example form of a database table 220. The database table 220 may store authentication and target user mapping data associated with the unassigned accounts 214. In one embodiment, the database table 220 may be included as part of databases 110 coupled to servers 106 in the data file management system 107. The database table 220 may be updated each time the data file administrator 112 provisions a target user (e.g., client machine 104) access to the data file 202 through the data file management system 107. The target user may communicate a request to be provisioned or the target user may be provisioned directly by the data file administrator 112. In the former case, the target user may be required to provide authentication information, either in the initial request or in subsequent communication with the data file management system 107. In the latter case, the target user may not have to provide authentication information when directly provisioned by the data file administrator 112.

In one embodiment, the provisioning of the target user is captured and stored in the database table 220. The database table 220 includes an identifier 222 that uniquely identifies its associated data file, in this example the data file 202. The unassigned accounts 216 (e.g., User 001) stored in the database table 220 is similar to the unassigned accounts 214 of the distributed data file 202 in FIG. 2A. The target user mapping 218 is used by the data file management system 107 to maintain a mapping of real target users/entities that have been associated with each unassigned account. Additionally, the database table 220 also maintains which of the unassigned accounts 216 are available to be mapped to another target user by the data file administrator 112 and the data file management system 107. Entry 224 illustrates the scalability of the database table 220 by showing the Nth entry in the database table 220 corresponding to an Nth data file.

Figure 3:
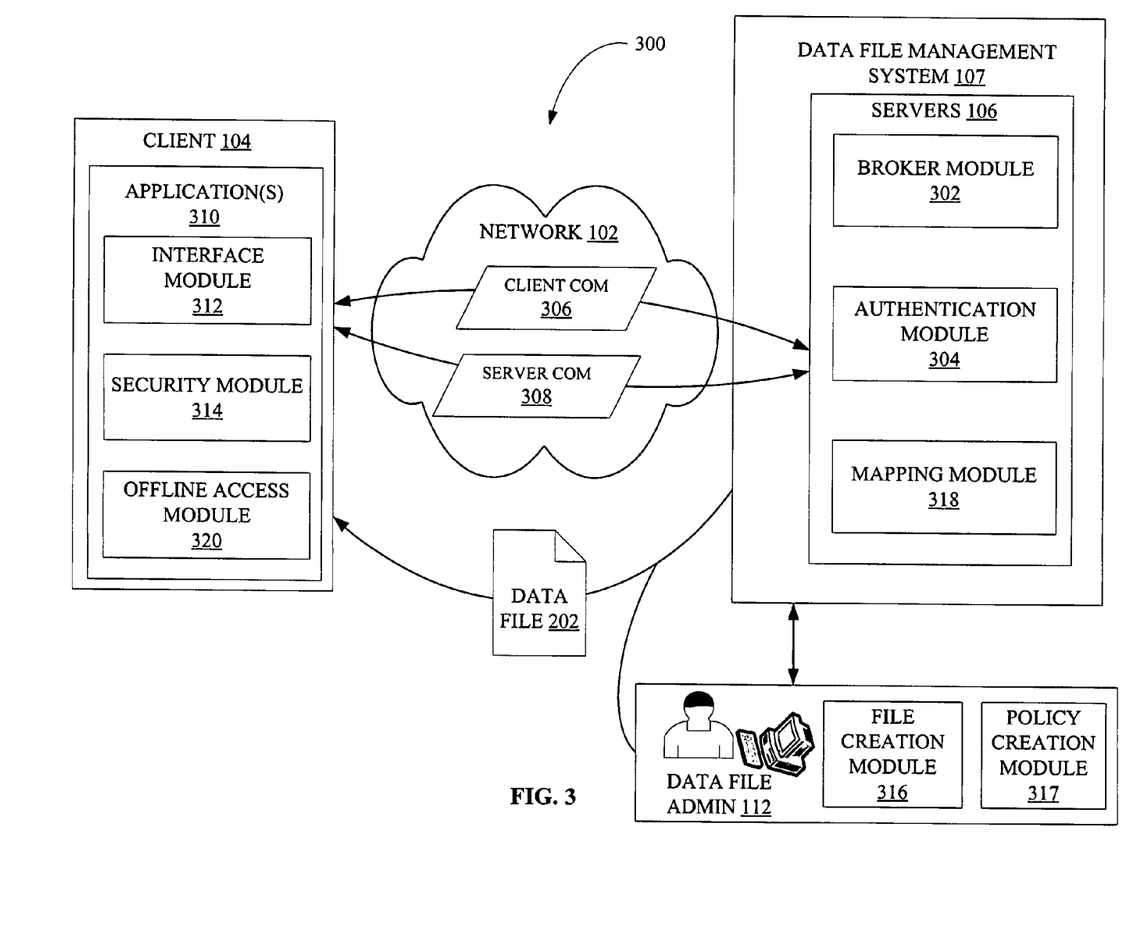
FIG. 3 is a block diagram illustrating an example embodiment of an authentication and provision workflow in a data file management system.

FIG. 3 is a block diagram illustrating an example embodiment of an authentication and provision workflow 300 in the data file management system 107. The client machine 104 may be in communication with the servers 106 via the network 102. The servers 106 may include a broker module 302 and an authentication module 304 to facilitate communication and authentication between the servers 106 and the client machine 104. In one embodiment, the client machine 104 receives the data file 202 from the data file administrator 112 either directly or through the data file management system 107. In one embodiment, the data file administrator 112 may use a file creation module 316 and a policy creation module 317 to create the data file 202 including the embedded data 204 associated with a policy controlling access to the data file. In other embodiments, the data file is created on, and/or the embedded data 204 is appended to, the data file 202 on a system remote from the data file administrator 112 and may be remotely or locally facilitated by the data file administrator 112. As such, one or both of the file creation module 316 and the policy creation module 317 may be locatable within the data file management system 107, such as within the servers 106, which may include a dedicated policy server (not shown).

The distribution of the data file 202 may be by email attachment, network download, computer readable medium, etc., and may originate from servers 106, such as the broker module 302. The broker module 302 may be part of a dedicated broker server (not shown) which may include additional server functions and resources. For example, the broker module 302 may include the functionality of a policy server including the functions of the policy creation module 317 and various client-server initiated operations (e.g., policy data embedding, editing, data file viewing, revoking access, encrypting and securing data files, etc.). For simplicity, all functions associated with provisioning access to a data file (e.g., data file 202) are described with respect to the broker module 302 and the authentication module 304.

However, in various embodiments, the communications, brokering, and authentication components may reside all or in part at the client machine 104, on one or more servers 106 of the data file management system 107, or on one or more other servers on a third party system (not shown). The client machine 104 and the broker module 302 may be configured to use existing enterprise authentication mechanisms (e.g., web-based target username/password authentication) or to implement a custom authentication mechanism (e.g., custom application, biometric authentication, or smart card system). For example, some authentication operations between the client machine 104 and the broker module 302 may be implemented using products and protocols such as Microsoft Windows® and LDAP (Lightweight Directory Access Protocol), respectively. It can be appreciated a multitude of hardware and software configurations are possible to distribute and process data associated with authentication and provisioning access to data files.

In one embodiment, the client machine 104 has to be authenticated to access the received data file 202. As mentioned above, the term "access" may include, but is not limited to, downloading, opening, viewing, editing, printing, and executing code within the data file 202. In various embodiments, authentication includes various operations, online or offline, to provision access to data file, such as data file 202. For example, the client machine 104 may request authentication for provisioning over the network 102 or alternatively, the client machine 104 may be provisioned access to the data file 202 without requesting authentication.

In one embodiment, authentication includes the client machine 104 sending one or more client communications 306 to access the data file 202 to the broker module 302 of the servers 106. For example, the client machine 104 may be requesting access to the data file 202 for the first time, communicating a renewal request to renew current access, a request for additional or increased access, or a contact message (e.g., heartbeat message) to continue access to a previously received data file prior to the expiration of a threshold time value (offline or online access). The request may include authentication data, which includes but is not limited to a data file identifier (e.g., file name, serial number, etc.), client information (e.g., personal data, hardware configuration data, etc.), and access credentials, such as a user name and password if previously provided to the client machine 104.

Based on the information in the client communications 306, the broker module 302 may respond to the client's request by sending one or more server communications 308 to the client machine 104. The client communications 306 and the server communications 308 may be of any type of network communication known in the art. For example, the client communications 306 and the server communications 308 may be one of or any combination of HTML (hypertext markup language), application specific protocols, messaging protocols, email protocols, etc.

The server communications 308 may include some or all of a rejection to the client communications 306, a user name and password if the client communications 306 resulted in authentication, and configuration data that may include executable code in furtherance of authenticating and provisioning a target user (e.g., client machine 104). In the example including executable code, the server communications 308 may become a component of the client machine 104 upon receipt, stand alone and communicate with the client machine 104, or may be a plug-in to a data file viewing application, such as the Adobe Acrobat® software provided by Adobe® Systems Incorporated of San Jose, Calif.

In one embodiment, the server communications 308 may be used in conjunction with an interface module 312 provided and operated by one or more application(s) 310 on the client machine 104 to communicate authentication information to the broker module 302. For example, the application(s) 310 may include a security handler component 314 that communicates with the broker module 302 based on the server communications 308. In other embodiments, the server communications 308 may be a client authentication library (e.g., a dynamic link library (DLL)) or a server service provider. In various embodiments, the authentication and provision workflow 300 may include several iterations of communications between the application(s) 310 of the client machine 104 and the broker module 302 prior to completion of the authentication process and provisioning of access to the data file 202.

The authentication module 304 using the server communications 308 may initiate an authentication process at the location of the client machine 104, interfacing and controlling any local hardware and/or software as needed (e.g., a biometric authentication procedure). Additionally, the server communications 308 may use or be used by one or more interfaces (e.g., via the interface module 312) provided at least in part by the application(s) 310 to communicate authentication information back to the broker module 302. The server communications 308 may implement a wide variety of different authentication procedures, including multi-level and/or multi-factor authentications, which may depend on the level of access requested. Because the server communications 308 may be dynamically delivered in response to each request, an organization may readily change authentication procedures, such as adding new security features to the data file management system 107.

The server communications 308 may query a target user at the client machine 104 for authentication data (e.g., access credentials). The input may then be encoded and returned to the broker module 302 or other authentication component (e.g., policy server or authentication server 330) associated with the broker module 302 in the client communications 306. The authentication data may include a user name, password, billing information (e.g., credit card data), third party payment service data, biometric data, etc.

In one embodiment, the authentication data is access credentials such as a user name and password previously supplied by the broker module 302 (via the authentication module 304) in response to a target user utilizing the client machine 104 to communicate the client communications 306 requesting access to the data file 202. The user name may correspond to an unassigned user name (e.g., User 001) in the embedded data 204 of the data file 202 and the password may be a key generated to allow the client machine 104 to decrypt and access the data file according to its policy and the access provisioned for the unassigned target user. For example with reference to FIG. 2A, the unassigned target user "User 001" and the supplied password may activate the key "Key 001" to provision access to the client machine 104 (the target user).

In another embodiment, the data file administrator 112 may, without receiving a request (e.g., via a client communications 306), initiate a push of authentication data via the data file management system 107 to the target user and optionally may require a conditional acknowledgment or other authentication data to complete the transaction. For example, the authentication data pushed out may be an unassigned user name from the unassigned accounts 210 of the data file 202 and a password (e.g., to access and/or activate the access key). The client machine 104 may then accept the terms of associated with the data file access and provide an acknowledgment response. The acknowledgement response may be the user name and password and included in a client communication, such as the client communications 306. In another example, the authentication data pushed out may be a renewal prior to an expiration of threshold time and in response to the client machine 104 (the target user) complying with a target user agreement (e.g., providing monthly payment, etc.). In yet another example, the authentication data pushed out may be a new user name and password associated with a different unassigned account and thus different access permissions. In various embodiments the association of the new unassigned account to the target user may be an increase or a decrease in access privileges to the data file in response to a target user request or pushed out from the data file administrator 112.

If authentication is successful the unassigned user name and password may then be mapped to the client machine 104 (e.g., by real user name) using a mapping module 318. For example, as discussed with reference to FIG. 2B, the mapping module 318 may map or associate an unassigned account "User 001" of the data file 202 to a real target user associated with the client machine 104, in this example, "Joe Jackson." Similarly, as the data file 202 is distributed to a multitude of target users all of the unassigned accounts 216 associated with the data file 202 may be mapped to real target users. Although illustrated as user names, the real target users may be any naming convention associated with a real entity. For example, the user name may be an email address, a company name, a screen name, etc. In another embodiment, the database table 220 may include the access keys 216 (not shown in FIG. 3), particularly if dynamically generated by the data file 202.

In another embodiment, all or a portion of the authentication may be performed at the client machine 104. For example, the authentication module 304 may not need to directly interpret client authentication information. Instead of the client machine 104 providing credentials directly to the authentication module 304, the client machine 104 may first at least partially authenticate provisional access and then provide some resulting information to the authentication module 304. In another example, the client machine 104 using an offline access module 320 may authenticate provisional access to the data file 202. The offline provisional access may expire at a predetermined threshold time unless re-authenticated online via the data file management system 107. In various embodiments re-authentication may include subscription renewal data, access credentials, or a contact message indicating the target user is online and accessing the document.

The authentication at the client machine 104 may be a result of programmatic operations associated or included with the data file (e.g., data file 202), included in the application(s) 310 (e.g., the offline access module 320), a third party authentication service or application, or a combination thereof.

In various embodiments, the authentication module 304 may use multiple authentication service providers. The authentication module 304 may initiate an authentication process by communicating one or more server communications 308 to the client machine 104. Server communications 308 associated with the authentication process may be delivered securely to the client machine 104. For example, spoofing may be prevented using secure code library loading. As mentioned above, the client machine 104 may locally have one or more default authentication processes already available, such as an authentication library that may capture target username-password text entry. Such a default authentication process may include support for target user interface (UI) customization and a standard format for extracting this information within authentication service providers. Moreover, the client machine 104 may retain credentials for a period of time such that a target user may have offline access and need not logon each time access is requested (e.g., opening the data file 202).

Secure code library loading may be implemented in any of the servers associated with the data file management system 107 to push one or more authentication libraries (e.g., DLLs, java bytecode, javascript, etc.) to clients (e.g., client machine 104). The authentication libraries may provide updates or customize clients without requiring any action (or knowledge) on the part of the target user and also may prevent the authentication libraries from being spoofed on the client (e.g., by a Trojan horse program, etc.). In various embodiments, one or more mechanisms may be provided to verify the authenticity of the authentication libraries downloaded from the authentication module 304. For example, when the authentication module 304 pushes an authentication library to the client machine 104, the authentication module 304 may compute a hash of the library and also send this hash to the client machine 104 and/or digitally sign the authentication library prior to communicating it to the client machine 104. The hash may be retained locally at the client, and the client machine 104 may ensure the authentication library is valid by computing a hash of the authentication library and verifying it against the retained value at load time. Additionally, a selected set of libraries may be signed by the provider, or all the libraries may be signed by the provider, and the provider's public key may be retained at the client machine 104 (e.g., a DLL may be signed by Adobe when the client machine 104 is the Adobe Acrobat® software with the Adobe public key included).

Figure 4:
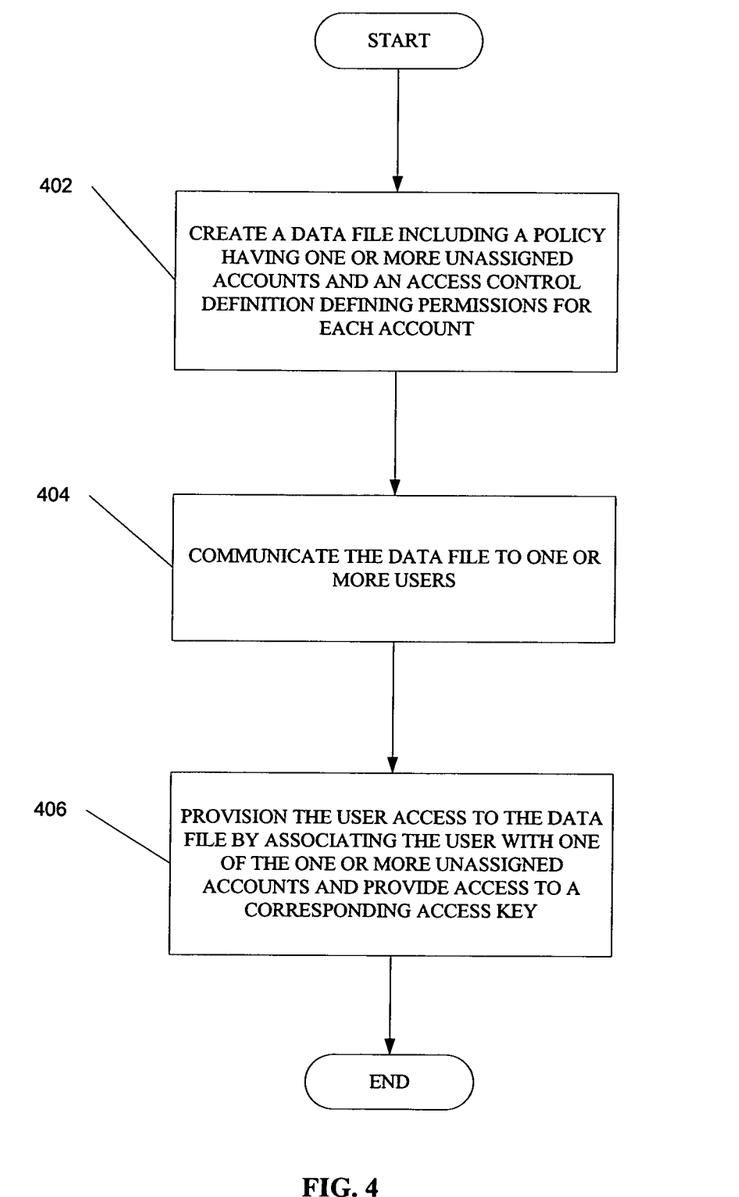
FIG. 4 illustrates a flowchart of an example embodiment for data file control and the provisioning of target users.

FIG. 4 illustrates a flowchart of an example embodiment for data file control and the provisioning of target users. In one embodiment, at operation 402, a data file (e.g., data file 202) is created for distribution to one or more clients (e.g., client machine(s) 104). The data file may include a policy having one or more unassigned accounts, assigned accounts, one or more access keys (e.g., access keys 216), and an access control definition that defines one or more access permissions for each account. In one embodiment, an access key when activated or accessed (e.g., via a user name and password) by the target user may unlock or provide access to the data file according to associated permissions associated with the unassigned users provisioned to the target user.

At operation 404, the data file is communicated to the client (target user). After the client receives the data file, at operation 406, the target user may be provisioned access to the data file by the association of the target user with one of the one or more unassigned accounts. This may include providing a user name and password to access an access key associated with the data file and the unassigned account. The access key security may be of any kind known in art, such as private/public key security, custom generated, etc.

Figure 5:
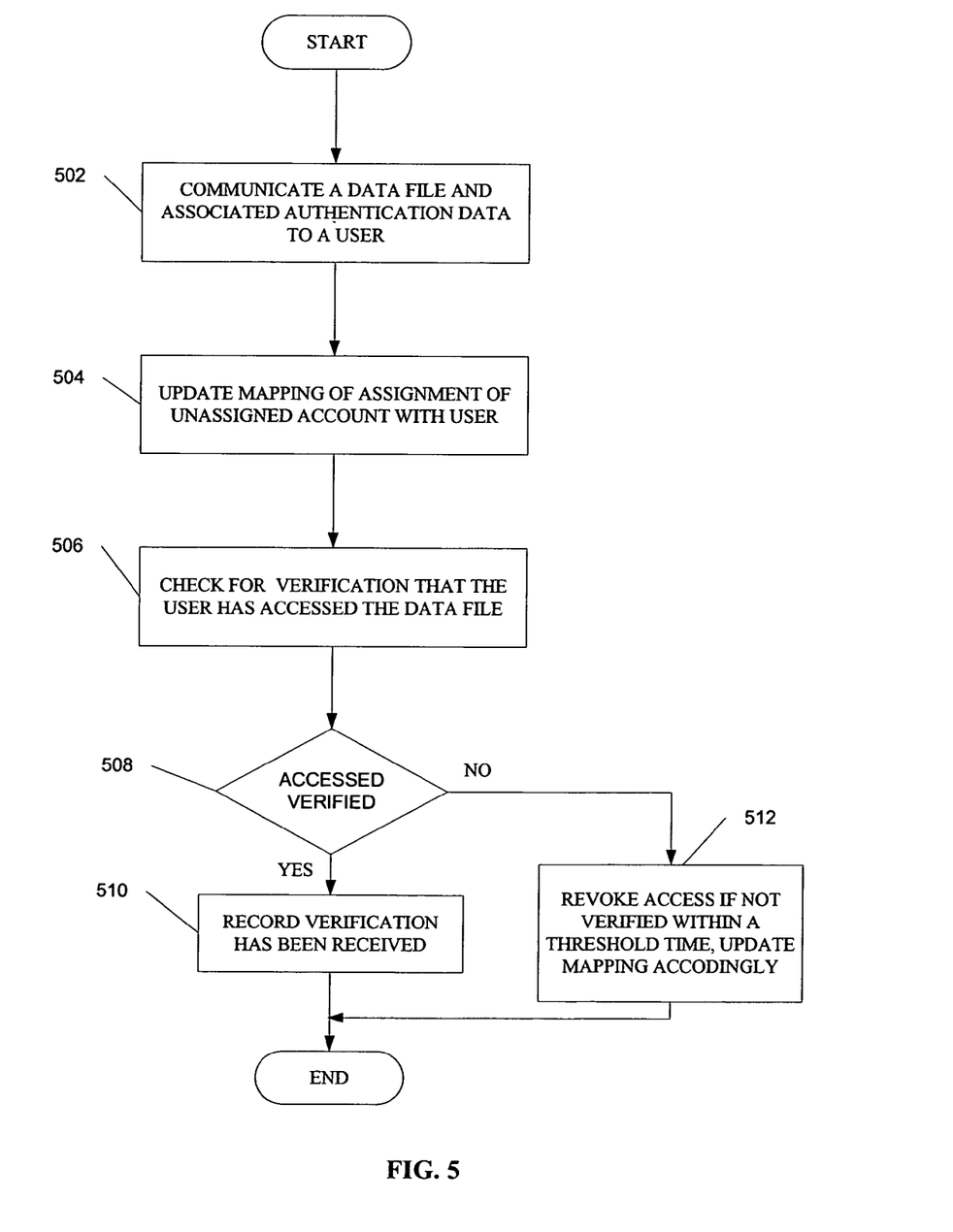
FIG. 5 is a flowchart illustrating an example embodiment for providing authentication data providing data file access to a target user.

FIG. 5 is a flowchart illustrating an example embodiment for providing authentication data providing data file access to a target user. At operation 502 the data file administrator 112 communicates a data file (e.g., data file 202) and authentication data to the client machine 104 via the data file management system 107. In one embodiment, the authentication data includes access credentials, such as a user name corresponding to an unassigned account in the data file's embedded data (e.g., embedded data 204) and a password that may activate the access key to provision access to the data file according to an access control definition associated with the unassigned account.

The data file management system 107, at operation 504, may then update a database table (e.g., the database table 220) by mapping the unassigned account associated with the data file to the client (target user) receiving the authentication data to access the data file. At operation 506 it is determined if verification has been received that the target user has accessed the data file. If the decision at operation 508 is yes, the data file management system 107 records, at operation 510, the verification has been received. If no, then the data file management system 107 may revoke access to the data file, at operation 512, if access not verified within a threshold amount of time. The revocation of access may be dependent upon which unassigned account has been assigned to the target user. For example, an unassigned account may be configured to not require verification while others may require verification. In another embodiment, the access may be granted to the target user such that the target user may permanently have control over the use and distribution of the data file.

Figure 6:
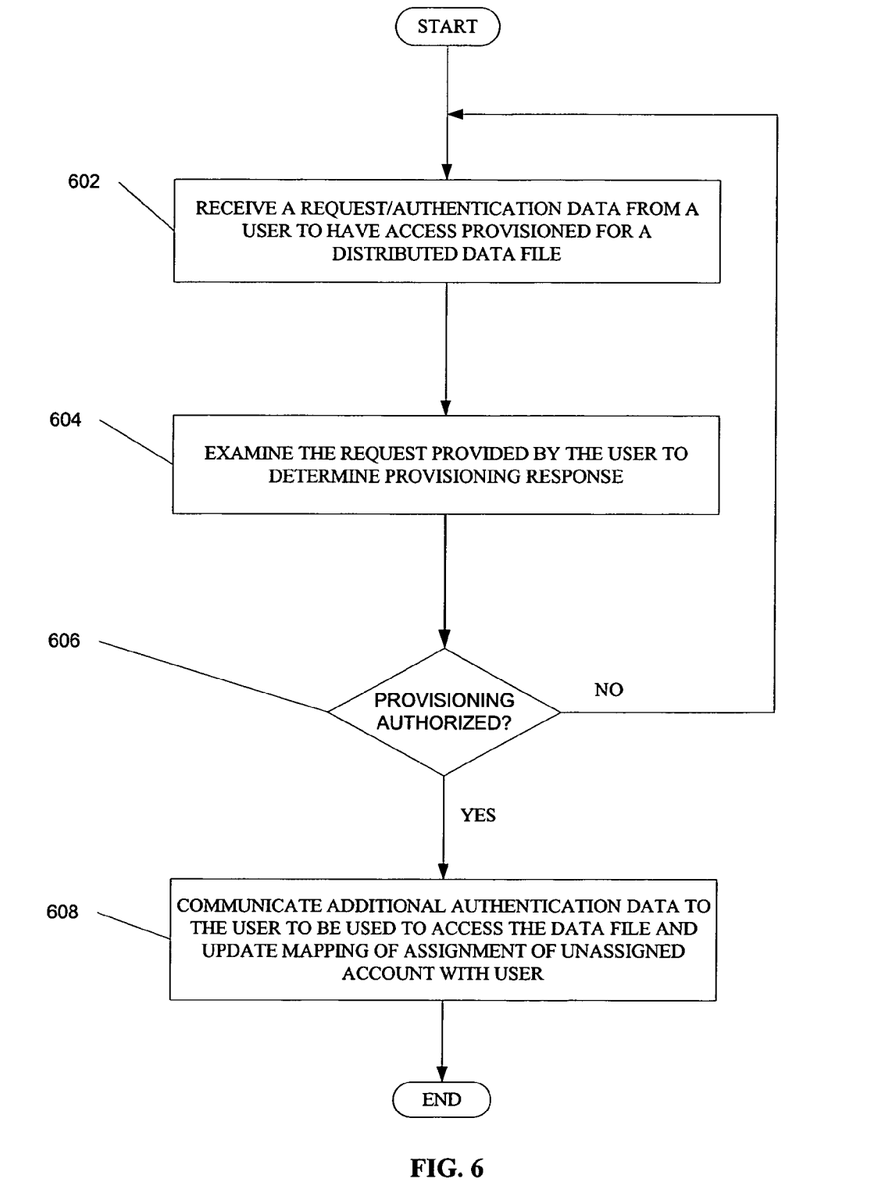
FIG. 6 is a flowchart illustrating an example embodiment for providing authentication data providing data file access to a target user.

FIG. 6 is a flowchart illustrating an example embodiment for providing authentication data to a target user. At operation 602 a request is received at the data file management system 107 from a target user requesting provisioned access to a distributed data file (e.g., data file 202). In one embodiment, as discussed above, the request may be authentication data that includes access credentials, such as personal data, credit card information, user name, etc.

The request is examined, at operation 604 to determine a provisioning response. For example, a target user may be provisioned an unassigned account configured for administrative type access to the data file, or the use may be provisioned an unassigned account that requires periodic submission to maintain access (e.g., subscription renewal). A decision is made at operation 606 to determine if provisioning is authorized based on one or more parameters, such as authentication data received in the request and/or the availability of an unassigned account. If provisioning has not been authorized the data file management system 107 may ignore the request or may communicate an authentication failure message to the target user. If provisioning is authorized additional authentication data, at operation 608, is communicated to the target user and a database table may be updated to map the assignment of the unassigned account associated with the data file to the target user. As discussed above, the additional authentication data may be a user name and password to access a security (access) key to access the data file.

Figure 7:
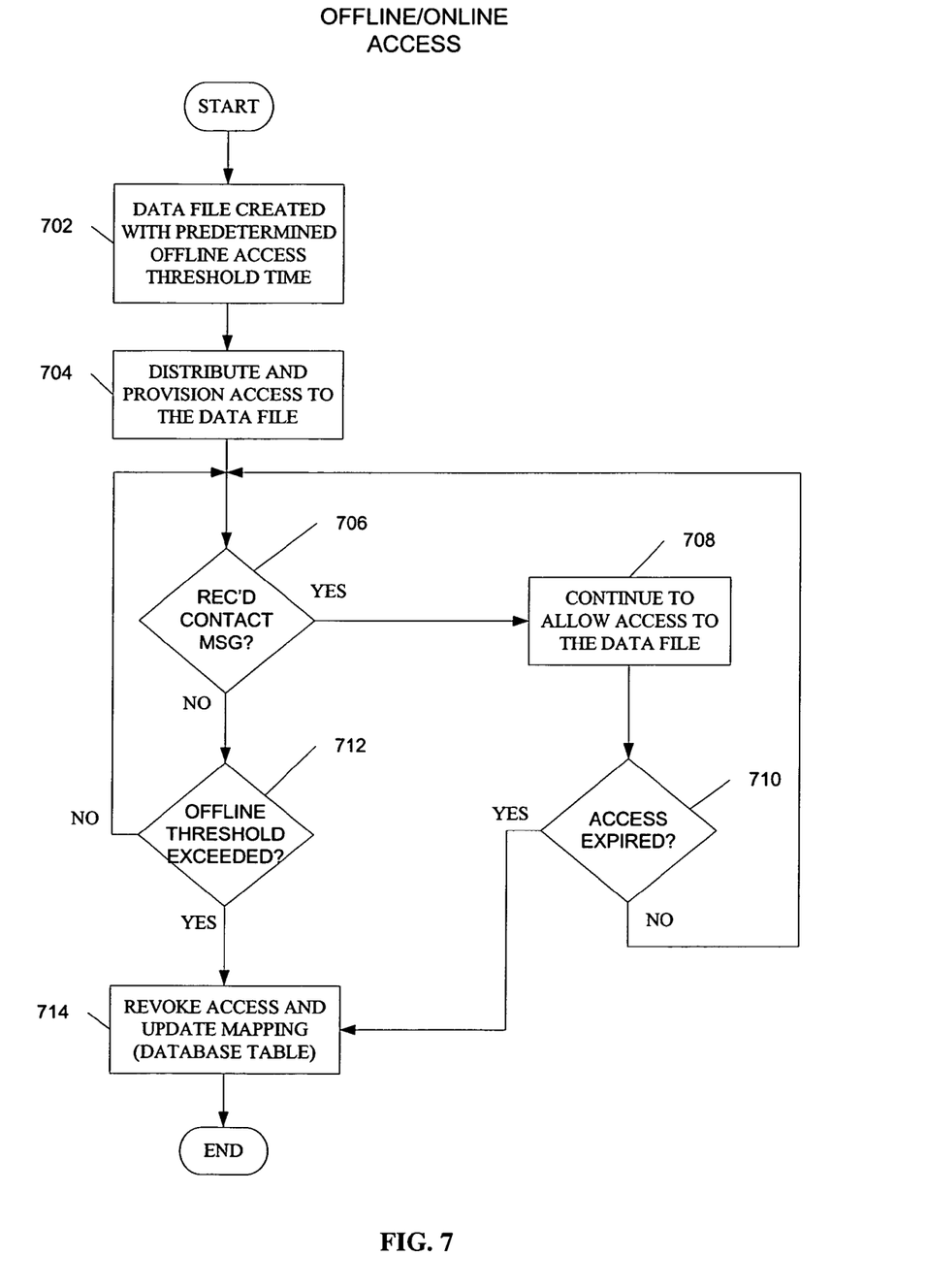
FIG. 7 is a flowchart illustrating an example embodiment for monitoring offline and online access to a data file.

FIG. 7 is a flowchart illustrating an example embodiment for monitoring offline and online access to a data file. At operations 702 and 704, a data file, such as data file 202, is created and distributed to one or more target users. The data file 202 may include embedded data, such as embedded data 204, that includes a threshold time that determines how long a target user may access the document in an offline mode. Offline access including when at least one of the target user or the data file application (or executable code therein) does not have at least periodic contact with the data file management system 107. The contact may include communications such as heartbeat messages, email, or other customized data transfers to indicate a continued interest in the data file 202.

At operation 706, if a contact message has been received, the data file management system 107 at operation 708 allows the target user to continued access to the data file 202. If access to the data file 202 has expired based on the exceeding an access threshold at operation 710, access is revoked at operation 714 and the mapping portion of the database table 220 is updated to reflect the revocation. If the access threshold has not been exceeded the flowchart returns to operation 706. In various embodiments, the access threshold may pertain to various expiration parameters. For example, the access threshold may be a predetermined time period based on when the data file management system 107 communicated the data file to the target user. In another example, the access threshold may be the number of accesses as determined by an access count as determined in periodic communications with the target user.

If, at operation 706, the contact message has not been received the data file management system 107 checks at operation 712 if an offline threshold time has been exceeded. If it has, then access is revoked at operation 714 and the mapping portion of the database table 220 is updated to reflect the revocation. If the offline timer has not expired, then the flowchart returns to operation 706 to check again for a contact message. The offline timer may or may not be synchronized to an internal offline timer associated with the document and/or its associated application. In various embodiments, upon expiration of the offline timer the target user may be required to provide again the original credentials to access the data file or may be required to receive or request new credentials to access the data file based on the rules and policies as may be determined by the data file administrator 112.

Figure 8:
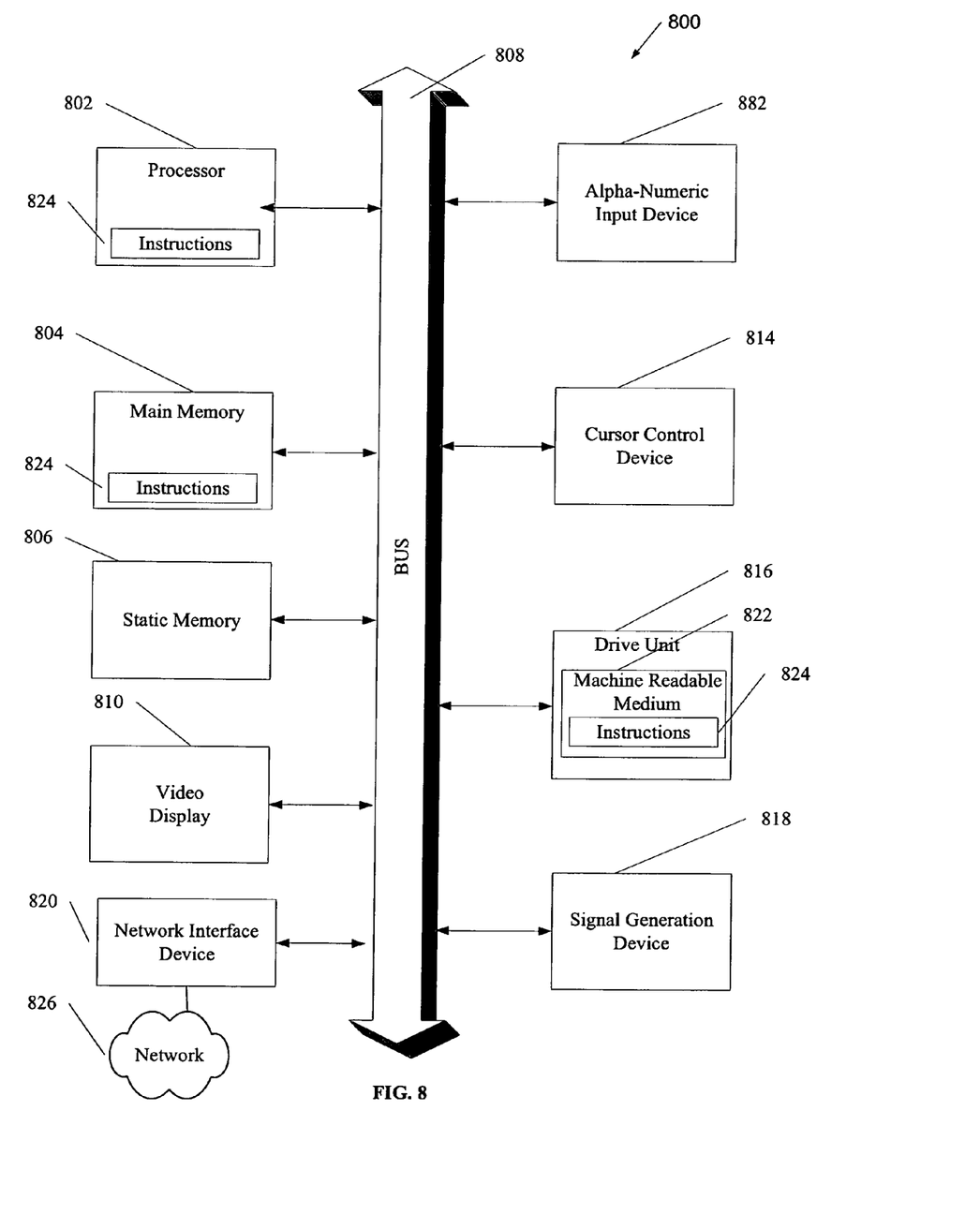
FIG. 8 shows a diagrammatic representation of machine in the example form of a computer system within which a set of instructions, for causing the machine to perform any one or more of the operations discussed herein, may be executed.

FIG. 8 shows a diagrammatic representation of machine in the example form of a computer system 800 within which a set of instructions, for causing the machine to perform any one or more of the operations discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the operations discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a target user interface (UI) navigation device 814 (e.g., a mouse), a disk drive unit 816, a signal generation device 818 (e.g., a speaker) and a network interface device 820.

The disk drive unit 816 includes a machine-readable medium 822 on which is stored one or more sets of instructions and data structures (e.g., software 824) embodying or utilized by any one or more of the operations or functions described herein. The software 824 may also reside, completely or at least partially, within the main memory 804 and/or within the processor 802 during execution thereof by the computer system 800, the main memory 804 and the processor 802 also constituting machine-readable media.

The software 824 may further be transmitted or received over a network 826 via the network interface device 820 utilizing any one of a number of well-known transfer protocols (e.g., HTTP).

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the operations of the present invention, or that is capable of storing, encoding or carrying data structures utilized by or associated with such a set of instructions. The term "machine-readable medium" shall accordingly be taken to include, but not be limited to, solid-state memories, and optical and magnetic media.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of provisioning access to a data file, the method comprising:
using one or more processors to perform at least a portion of one or more of the following acts of:
generating the data file;
generating a policy, the policy including one or more unassigned accounts and an access control definition defining an access permission associated with each of the one or more unassigned accounts, the one or more unassigned accounts not having an association with a user or an entity;
associating the policy with the data file;
embedding the policy within the data file;
associating a target user with a first unassigned account of the one or more unassigned accounts; and communicating authentication data pertaining to the first unassigned account to the target user, the authentication data used by the target user to access the data file.

2. The method of claim 1, wherein the authentication data is a user name corresponding to the first unassigned account and a password to activate an access key associated with the access control definition defining the access permission associated with the first unassigned account.

3. The method of claim 1, including receiving a contact message indicating a target user is online and has access to the data file.

4. The method of claim 1, including revoking access of a target user to the data file based on determining the target user has not communicated a contact message within an offline threshold time.

5. The method of claim 1, including revoking the target user access to the data file based on the target user accessing the data file beyond an access threshold.

6. The method of claim 5, wherein the access threshold is a time determined by when the data file was communicated to the target user.

7. The method of claim 5, wherein the access threshold is a number of times the target user has accessed the data file.

8. The method of claim 1, wherein the access permission associated with access to the data file includes at least one selected from a group including view, print, edit, distribute, and copy.

9. The method of claim 1, including receiving a request from the target user to access to the data file.

10. The method of claim 9, wherein the request from the target user to access to the data file includes payment information for accessing the data file.

11. The method of claim 9, including receiving a second request from the target user to renew access to the data file.

12. The method of claim 11, including renewing access to the data file and maintaining the association of the target user to the first unassigned account.

13. The method of claim 1, including receiving a request from a data file administrator to provision a target user access to the data file.

14. The method of claim 1, including communicating authentication data pertaining to the first unassigned account to the target user, the authentication data used by the target user to access the data file.

15. A system configured to provision access to a data file, the system comprising:
at least one processor; and
a memory in communication with the at least one processor, the memory being configured to store a file creation module and a policy creation module that are executable by the at least one processor,
the file creation module having instructions, that when executed by the at least one processor, cause operations to be performed, comprising generating the data file; and
a policy creation module having instructions, that when executed by the at least one processor, cause operations to be performed, comprising:
creating a policy including one or more unassigned accounts and an access control definition defining an access permission associated with each of the one or more unassigned accounts, the one or more unassigned accounts not having an association with a user or an entity;
associating the policy with the data file; and
embedding the policy within the data file.

16. The system of claim 15, including a mapping module to map a target user with a first unassigned account of the one or more unassigned accounts.

17. The system of claim 16, wherein prior to the mapping module to map, the broker module to receive a request from a data file administrator to permit the target user access to the data file.

18. The system of claim 16, including an authentication module to communicate authentication data for the first unassigned account to a target user of a client machine used to access the data file according to the access permission associated with the first unassigned account.

19. The system of claim 18, including an authentication module to communicate new authentication data to provide a target user with a new level of access to the data file.

20. The system of claim 18, including a broker module to receive a request from the target user to continue provisional access to the data file.

21. The system of claim 18, wherein the authentication data includes a user name corresponding to the first unassigned account and a password to access an access key to access the data file.

22. The system of claim 15, including a broker module to receive a request to communicate the data file to a target user.

23. The system of claim 15, including a broker module to receive a request from a target user to access to the data file.

24. The system of claim 15, including the broker module to receive a contact message indicating the target user has access to the data file.

25. The system of claim 15, including the broker module to determine the target user has not communicated a contact message within an offline threshold time and to revoke access to the data file.

26. The system of claim 15, including the broker module to determine the target user accessed the data file beyond an access threshold and to revoke access to the data file.

27. The system of claim 26, wherein the access threshold is a time determined by when the data file was communicated to the target user.

28. The system of claim 26, wherein the access threshold is a number of times the target user has accessed the data file.

29. A machine-readable medium embodying instructions to provision access to a data file, the instructions, when executed by a machine, cause the machine to:
generate the data file;
create a policy and to associate the policy with the data file, the policy including one or more unassigned accounts, one or more assigned accounts, and an access control definition defining an access permission associated with each of the one or more unassigned accounts and the one or more assigned accounts, the one or more unassigned accounts not having an association with a user or an entity and the one or more assigned accounts having an association with another user or another entity; and
embed the policy within the data file.

30. The machine-readable medium of claim 29, the instructions to further cause the machine to map a target user with a first unassigned account of the one or more unassigned accounts.

31. The machine-readable medium of claim 30, the instructions to further cause the machine to communicate authentication data for the first unassigned account to a target user of a client machine used to access the data file according to the access permission associated with the first unassigned account.

32. The machine-readable medium of claim 31, the instructions to further cause the machine to determine the target user has not communicated a contact message within an offline threshold time and to revoke access to the data file.

33. The machine-readable medium of claim 31, the instructions to further cause the machine to determine the target user accessed the data file beyond an access threshold and to revoke access to the data file.

34. A method of provisioning access to a data file, the method comprising:
   using one or more processors to perform at least a portion of one or more of the following acts of:
   associating a policy with the data file to be accessed by a target user, the policy being embedded within the data file, the policy including one or more unassigned accounts and an access control definition defining an access permission associated with each of the one or more unassigned accounts, the one or more unassigned accounts not having an association with a user or an entity; and
   associating the target user with a first unassigned account of the one or more unassigned accounts.

35. A computer-readable medium having stored thereon a data structure configured to provision access to a data file, the data structure comprising:
   a first data field containing data representing one or more unassigned accounts, the one or more unassigned accounts not having an association with a user or an entity; and
   a second data field containing data representing an access control definition defining an access permission associated with each of the one or more unassigned accounts,
   wherein the first data field and the second data field are embedded in the data file.

* * * * *